United States Patent
Yamane et al.

(10) Patent No.: US 9,020,112 B2
(45) Date of Patent: Apr. 28, 2015

(54) COMMUNICATION APPARATUS AND COMMUNICATION SYSTEM

(75) Inventors: Yukinori Yamane, Nagoya (JP); Tadahiro Kunii, Nagoya (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 717 days.

(21) Appl. No.: 12/884,761

(22) Filed: Sep. 17, 2010

(65) Prior Publication Data

US 2011/0129075 A1     Jun. 2, 2011

(30) Foreign Application Priority Data

Nov. 30, 2009    (JP) ................................ 2009-271068

(51) Int. Cl.
     *H04M 11/00*      (2006.01)
     *H04N 1/00*      (2006.01)
     *H04N 1/327*      (2006.01)

(52) U.S. Cl.
     CPC ....... *H04N 1/00347* (2013.01); *H04N 1/32704* (2013.01); *H04N 1/32708* (2013.01); *H04N 1/32747* (2013.01); *H04N 2201/001* (2013.01); *H04N 2201/0015* (2013.01);
(Continued)

(58) Field of Classification Search
     USPC ............................. 379/88.13, 93.01, 100.15
     See application file for complete search history.

(56) References Cited

U.S. PATENT DOCUMENTS 6,278,775 B1 *   8/2001    Sih et al. .................. 379/100.17
6,900,903 B1       5/2005    Iida
(Continued)

FOREIGN PATENT DOCUMENTS

CN      1764222 A     4/2006
CN      1764333 A     4/2006
(Continued)

OTHER PUBLICATIONS

Notification of First Office Action dated May 2, 2013 received from the Chinese Patent Office from related Chinese Application No. 2010-10568664.X, together with an English-language translation.
(Continued)

*Primary Examiner* — Joseph T Phan
(74) *Attorney, Agent, or Firm* — Scully, Scott, Murphy & Presser, P.C.

(57) ABSTRACT

A communication apparatus including: a relaying section which relays phone conversation between a sub-communication apparatus and an external communication apparatus which is in a communicable connection state by the communication controlling portion; a request section which requests, when a transmission command for transmitting transmission data has been transmitted from the sub-communication apparatus performing the phone conversation with the external communication apparatus, a data processing apparatus to transmit the transmission data while maintaining a connection state between the communication apparatus and the external communication apparatus to the communicable connection state; a receiving section which receives the transmission data transmitted from the data processing apparatus in response to the request of the request section; and a transmitting section which transmits the transmission data received by the receiving section to the external communication apparatus being in the communicable connection state.

14 Claims, 7 Drawing Sheets

(52) U.S. Cl.
CPC ............ *H04N 2201/0055* (2013.01); *H04N 2201/0093* (2013.01); *H04N 2201/0094* (2013.01)

(56) References Cited

U.S. PATENT DOCUMENTS

| | | | |
|---|---|---|---|
| 6,956,677 B1* | 10/2005 | Cohen | 358/435 |
| 7,573,995 B2* | 8/2009 | Gross et al. | 379/210.01 |
| 7,596,691 B2* | 9/2009 | Koue et al. | 713/154 |
| 7,659,985 B2* | 2/2010 | Street, Jr. | 356/436 |
| 7,808,671 B1* | 10/2010 | Kirchhoff et al. | 358/1.15 |
| 7,831,029 B2* | 11/2010 | Gross et al. | 379/207.02 |
| 7,865,714 B2* | 1/2011 | Koue et al. | 713/150 |
| 7,965,825 B1* | 6/2011 | Herriman et al. | 379/100.08 |
| 8,031,360 B2* | 10/2011 | Kirchhoff et al. | 358/1.15 |
| 8,081,332 B2* | 12/2011 | Nagarajan et al. | 358/1.15 |
| 8,150,479 B2* | 4/2012 | Tenorio Sanz et al. | 455/574 |
| 2002/0157028 A1* | 10/2002 | Koue et al. | 713/202 |
| 2002/0172333 A1* | 11/2002 | Gross et al. | 379/88.22 |
| 2004/0105535 A1* | 6/2004 | Gross et al. | 379/201.01 |
| 2004/0125396 A1* | 7/2004 | Burke | 358/1.13 |
| 2004/0146153 A1* | 7/2004 | Solin | 379/210.02 |
| 2004/0170257 A1* | 9/2004 | Gross et al. | 379/67.1 |
| 2004/0218226 A1* | 11/2004 | Antognini et al. | 358/402 |
| 2005/0153739 A1* | 7/2005 | Halsell | 455/557 |
| 2007/0070399 A1* | 3/2007 | Nakamura et al. | 358/1.15 |
| 2007/0071190 A1* | 3/2007 | Denpo | 379/93.09 |
| 2007/0124575 A1* | 5/2007 | Koue et al. | 713/150 |
| 2007/0124576 A1* | 5/2007 | Koue et al. | 713/150 |
| 2007/0206739 A1* | 9/2007 | Livengood et al. | 379/100.01 |
| 2007/0208931 A1* | 9/2007 | Koue et al. | 713/150 |
| 2008/0007789 A1* | 1/2008 | La | 358/400 |
| 2008/0007791 A1* | 1/2008 | Nagarajan et al. | 358/402 |
| 2008/0074705 A1* | 3/2008 | Shimoyama | 358/400 |
| 2008/0137151 A1* | 6/2008 | Street | 358/407 |
| 2008/0218809 A1* | 9/2008 | Chen et al. | 358/407 |

FOREIGN PATENT DOCUMENTS

| | | |
|---|---|---|
| JP | A-05-083458 | 4/1993 |
| JP | A-06-276348 | 9/1994 |
| JP | A-09-153959 | 6/1997 |
| JP | A-10-155072 | 6/1998 |
| JP | A-11-069124 | 3/1999 |
| JP | A-2003-179723 | 6/2003 |
| JP | 2007-089041 | 4/2007 |

OTHER PUBLICATIONS

Notification of the Second Office Action dated Jan. 14, 2014 received from the Chinese Patent Office from related Chinese Application No. 2010-10568664.X.

Notification of the Third Office Action dated Jul. 29, 2014 received from the Chinese Patent Office from related Chinese Application No. 201010568664.X together with an English-language translation.

Decision on Rejection dated Feb. 11, 2015 received from the Chinese Patent Office from related Chinese Application No. 2010-10568664.X together with an English language translation.

* cited by examiner

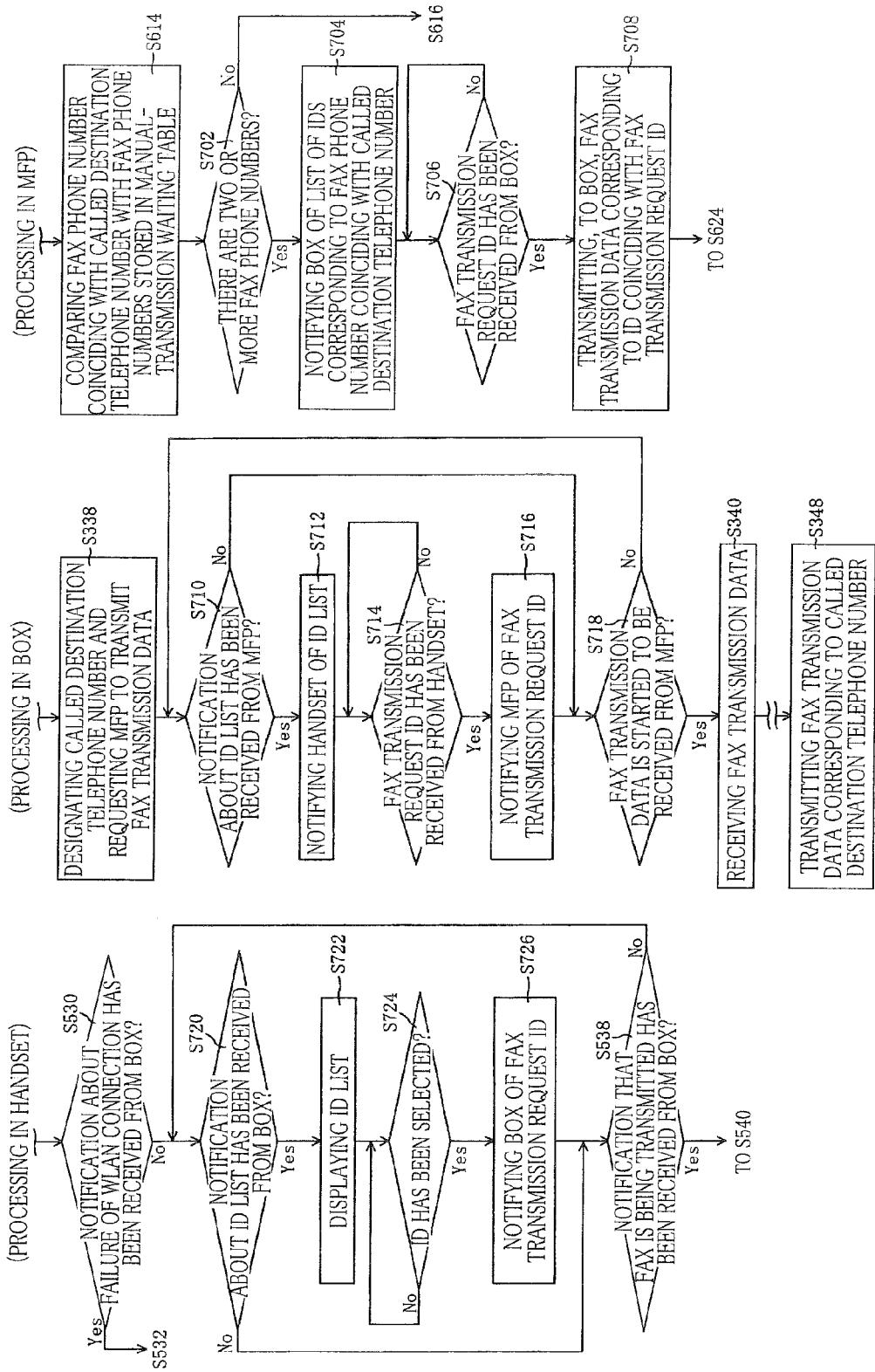

COMMUNICATION APPARATUS AND COMMUNICATION SYSTEM

CROSS REFERENCE TO RELATED APPLICATION

The present application claims priority from Japanese Patent Application No. 2009-271068, which was filed on Nov. 30, 2009, the disclosure of which is herein incorporated by reference in its entirety.

BACKGROUND OF THE INVENTION

1. Field of the Invention

The present invention relates to a communication apparatus and a communication system.

2. Description of the Related Art

There is known a technique for performing a facsimile transmission to a destination dialed by a cordless handset when a facsimile-transmission start button provided on a multi-function peripheral is pushed during a phone conversation using the handset.

SUMMARY OF THE INVENTION

However, in the above-described technique, in the case where, when a user has pushed the facsimile-transmission start button on the multi-function peripheral, another user has coincidentally made a phone call by the handset to a destination different from the destination of the facsimile transmission, there is a possibility of causing an erroneous transmission in which the facsimile is transmitted to the destination different from the destination of the facsimile transmission.

The present invention has been developed in view of the above-described situations, and it is an object of the present invention to provide a communication apparatus and a communication system which can suppress an occurrence of an erroneous transmission.

The object indicated above may be achieved according to the present invention which provides a communication apparatus comprising: a communication portion configured to perform a data communication with a sub-communication apparatus; a data transmitting and receiving portion configured to transmit and receive data to and from a data processing apparatus configured to process transmission data to be transmitted to an external communication apparatus; a connecting portion configured to connect the communication apparatus to a communication network; a communication controlling portion configured to control a connection state between the communication apparatus and the external communication apparatus via the communication network connected by the connecting portion; a relaying section configured to relay a phone conversation between the sub-communication apparatus and the external communication apparatus in a state in which the connection state is in a communicable connection state in which the external communication apparatus is communicable with the communication apparatus, by the communication controlling portion; a request section configured to request, when a transmission command for transmitting the transmission data has been transmitted via the communication portion from the sub-communication apparatus performing the phone conversation with the external communication apparatus which is being relayed by the relaying section, the data processing apparatus via the data transmitting and receiving portion to transmit the transmission data while maintaining the connection state to a communicable connection state in which the communication apparatus is communicable with the external communication apparatus; a receiving section configured to receive the transmission data transmitted from the data processing apparatus in response to the request of the request section; and a transmitting section configured to transmit the transmission data received by the receiving section to the external communication apparatus, while maintaining the connection state to the communicable connection state in which the external communication apparatus is communicable with the communication apparatus.

It is noted that the present invention can be realized in various forms, in addition to the communication apparatus, such as a communication controlling apparatus configured to control the communication apparatus, a communication method, a communication controlling program for controlling the communication apparatus, and a storage medium for storing the communication controlling program.

According to the construction as described above, when the communication apparatus has received the transmission command of the transmission data from the sub-communication apparatus whose phone conversation is relayed, the request section requests the data processing apparatus to transmit the transmission data while maintaining the communicable connection state between the communication apparatus and the external device. Then, the transmitting section transmits the transmission data transmitted from the data processing apparatus which has replied the request, to the external device maintaining the communicable connection state. Thus, the user can recognize the destination external apparatus by performing the phone conversation using the sub-communication apparatus and then command, by operating the sub-communication apparatus, the communication apparatus to transmit the transmission data to the destination external apparatus. Thus, it is possible to suppress an occurrence of an erroneous transmission in which the transmission data is transmitted to a destination not intended.

The object indicated above may also be achieved according to the present invention which provides a communication system comprising (a) a data processing apparatus configured to process transmission data to be transmitted to an external communication apparatus and (b) a communication apparatus which includes: a communication portion configured to perform a data communication with a sub-communication apparatus; a data transmitting and receiving portion configured to transmit and receive data to and from the data processing apparatus; a connecting portion configured to connect the communication apparatus to a communication network; and a communication controlling portion configured to control a connection state between the communication apparatus and the external communication apparatus via the communication network connected by the connecting portion, the communication apparatus further including: a relaying section configured to relay a phone conversation between the sub-communication apparatus and the external communication apparatus in a state in which the connection state is in a communicable connection state in which the external communication apparatus is communicable with the communication apparatus, by the communication controlling portion; a request section configured to request, when a transmission command for transmitting the transmission data has been transmitted via the communication portion from the sub-communication apparatus performing the phone conversation with the external communication apparatus which is being relayed by the relaying section, the data processing apparatus via the data transmitting and receiving portion to transmit the transmission data while maintaining the connection state to a communicable connection state in which the communication apparatus is communicable with the external communication apparatus; a receiving section configured to receive the transmission data transmitted from the data processing apparatus in response to the request of the request section; and a transmitting section configured to transmit the transmission data received by the receiving section to the external communication apparatus, while maintaining the connection state to the communicable connection state in which the external communication apparatus is communicable with the communication apparatus.

According to the construction as described above, when the communication apparatus has received the transmission command of the transmission data from the sub-communication apparatus whose phone conversation is relayed, the request section requests the data processing apparatus to transmit the transmission data while maintaining the communicable connection state between the communication apparatus and the external device. Then, the transmitting section transmits the transmission data transmitted from the data processing apparatus which has replied the request, to the external device maintaining the communicable connection state. Thus, the user can recognize the destination external apparatus by performing the phone conversation using the sub-communication apparatus and then command, by operating the sub-communication apparatus, the communication apparatus to transmit the transmission data to the destination external apparatus. Thus, it is possible to suppress an occurrence of an erroneous transmission in which the transmission data is transmitted to a destination not intended.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which:

FIG. 7A is a flow-chart partly showing a facsimile manual-transmission processing performed by a handset in a second embodiment, FIG. 7B is a flow-chart partly showing a facsimile transmission processing performed by a BOX in the second embodiment, and FIG. 7C is a flow-chart partly showing a facsimile mode processing performed by an MFP in the second embodiment.

DESCRIPTION OF THE EMBODIMENTS

Figure 1:
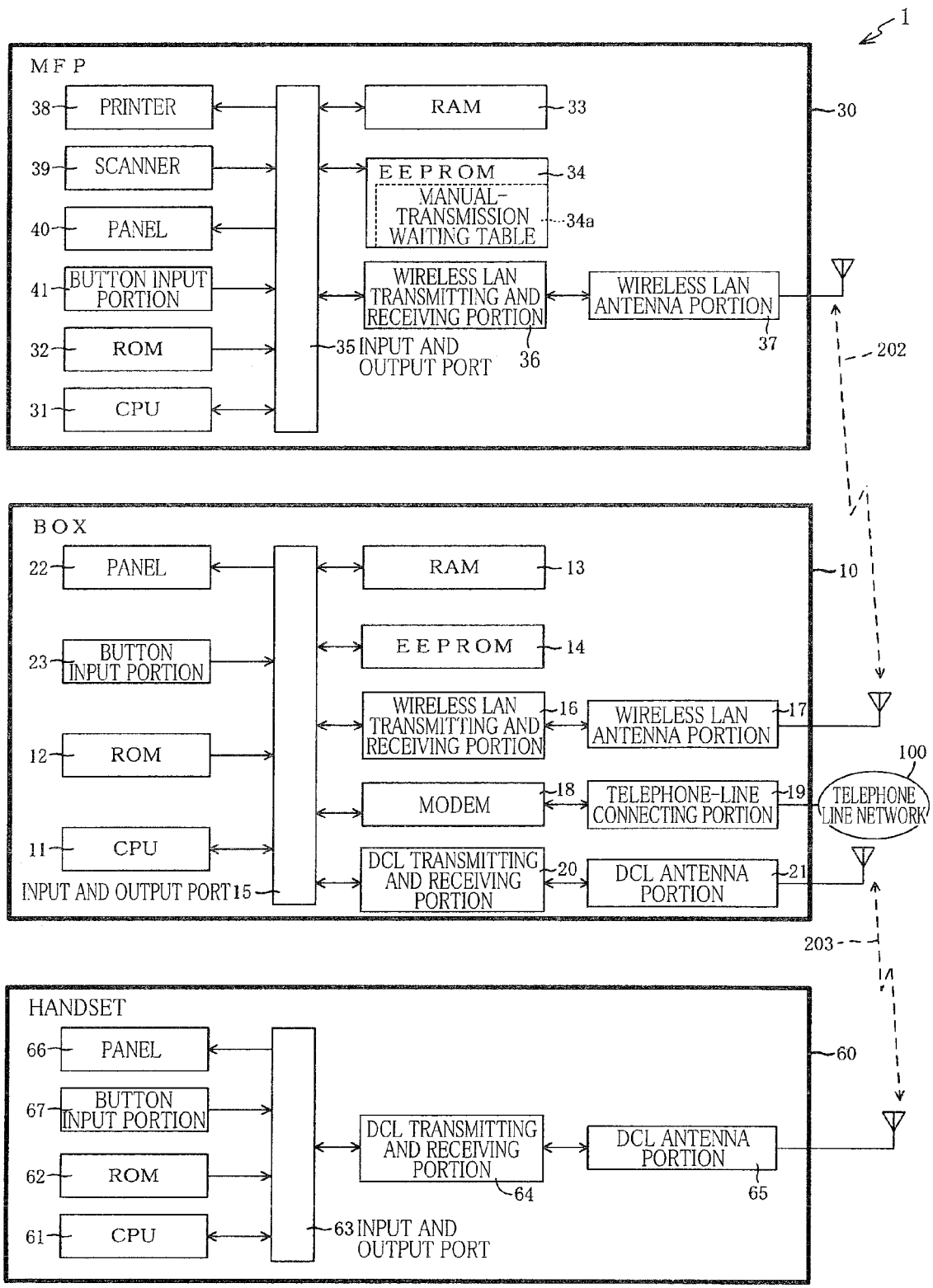
FIG. 1 is a block diagram showing an electric construction of a communication system including a BOX as an example of a communication apparatus to which the present invention is applied, and an MFP and a handset.

Hereinafter, there will be described embodiments of the present invention by reference to the drawings. FIG. 1 shows a communication system 1 including (a) a line controlling apparatus (hereinafter may be referred to as a "BOX") 10 as an embodiment of a communication apparatus to which the present invention is applied, and (b) a multi-function peripheral (hereinafter may be referred to as an "MFP") 30 as a data processing apparatus and (c) a handset 60 as a sub-communication apparatus. The BOX 10 is a communication apparatus which performs a control of a communication using a telephone line network 100 as a communication network. The MFP 30 has various functions such as a printer function, a scanner function, a copying function, and a facsimile function, and produces data (hereinafter may be referred to as "facsimile transmission data") to be transmitted to an external device (i.e., an external communication apparatus). The handset 60 is a digital cordless phone device for performing a phone conversation with the external device via the telephone line network 100. It is noted that, where the BOX 10 and the handset 60 are considered to have a relationship in which the BOX 10 is a base unit for the handset 60, the BOX 10 and the handset 60 can be considered to constitute a single digital cordless phone as a pair. In this case, the base unit to which the BOX 10 corresponds can be defined as an apparatus connectable to a destination external device by being directly connected to the telephone line network 100, and the handset can be defined as a device which can communicate with the base unit and which can be connected to the destination external device by being connected to the telephone line network 100 only via the base unit. Further, where the BOX 10 and the MFP 30 are constructed integrally with each other, an apparatus including the BOX 10 and the MFP 30 can be defined as the base unit.

The BOX 10 is configured so as to suppress occurrence of erroneous transmission upon transmitting, by facsimile transmission via the telephone line network 100, the facsimile transmission data transmitted from the MFP 30. It is noted that the BOX 10 as the present embodiment is explained as an apparatus configured to transmit and receive the data by G3FAX using the telephone line network 100, but the BOX 10 may perform the facsimile transmission using another standard such as G4FAX, IPFAX, and Internet FAX.

The BOX 10 includes a CPU 11, a ROM 12, a RAM 13, an EEPROM 14, a wireless LAN transmitting and receiving portion 16 as a part of a data transmitting and receiving portion, a wireless LAN antenna portion 17 as a part of the data transmitting and receiving portion, a modem 18 as a part of a connecting portion and a communication controlling portion, a telephone-line connecting portion 19 as a part of the connecting portion and the communication controlling portion, a digital cordless telephone (DCL) transmitting and receiving portion 20 as a part of a communication portion, a DCL antenna portion 21 as a part of the communication portion, a panel (a display) 22, and a button input portion 23. These components are connected to one another via an input and output port 15 so as to communicate with one another.

The CPU 11 is configured to control the components connected to the input and output port 15 in accordance with fixed values and programs stored in, e.g., the ROM 12, or various signals transmitted and received via wireless communications 202, 203. The ROM 12 is an unrewritable memory and is configured to store programs for performing processings which will be described below with reference to FIGS. 3 and 4. The RAM 13 is a rewritable volatile memory. The EEPROM 14 is a rewritable nonvolatile memory.

The wireless LAN transmitting and receiving portion 16 is a circuit for performing the wireless communication 202 using 2.4 GHz band by using wireless LAN adhering to the IEEE802.11b/g standard. This wireless LAN transmitting and receiving portion 16 makes a connection to the MFP 30 so as to allow data communication. Digital signals respectively constituting various data are transmitted and received via the wireless LAN antenna portion 17. The modem 18 is configured to convert the facsimile transmission data to be transmitted in the facsimile function into a signal transmittable to the telephone line network 100 and is configured to transmit the signal via the telephone-line connecting portion 19. Further, the modem 18 is configured to receive a signal inputted from the telephone line network 100 via the telephone-line connecting portion 19 and decode the signal into image data. The telephone-line connecting portion 19 is configured to connect the telephone line network 100 and the BOX 10 to each other and control a connection state between the BOX 10 and the external device via the telephone line network 100 by connecting or disconnecting the line in accordance with a command outputted from the modem 18.

The DCL transmitting and receiving portion 20 is a wireless circuit for transmitting and receiving control data and voice data between the BOX 10 and the handset 60 via the DCL antenna portion 21 by the wireless communication 203 in a digital system using 2.4 GHz band. The panel 22 displays thereon various functional information of the BOX 10. The button input portion 23 includes a plurality of buttons for performing the functions of the BOX 10.

The MFP 30 includes a CPU 31, a ROM 32, a RAM 33, an EEPROM 34, a wireless LAN transmitting and receiving portion 36, a wireless LAN antenna portion 37, a printer 38, a scanner 39, a panel (a display) 40, and a button input portion 41. These components are connected to one another via an input and output port 35 so as to communicate with one another.

The CPU 31 is configured to control the various functions and the components connected to the input and output port 35 in accordance with fixed values and programs stored in, e.g., the ROM 32, or various signals transmitted and received via the wireless LAN transmitting and receiving portion 36.

The ROM 32 is an unrewritable memory storing control programs performed by the MFP 30 and stores programs for performing processings which will be described below with reference to FIG. 6. The RAM 33 is a rewritable volatile memory. The EEPROM 34 is a rewritable nonvolatile memory and includes a manual-transmission waiting table 34a as a storage portion. The manual-transmission waiting table 34a will be explained below with reference to FIG. 2. The wireless LAN transmitting and receiving portion 36 is a circuit configured in a similar manner to the above-described wireless LAN transmitting and receiving portion 16 and form a wireless LAN connection between the MFP 30 and the BOX 10.

The printer 38 is configured to perform printing or recording. The scanner 39 is configured to perform reading of a document. The panel 40 displays thereon various functional information of the MFP 30. The button input portion 41 includes a plurality of buttons for performing the functions of the MFP 30.

The handset 60 includes a CPU 61, a ROM 62, a DCL transmitting and receiving portion 64, a DCL antenna portion 65, a panel (a display) 66, and a button input portion 67 as a command receiving portion. These components are connected to one another via an input and output port 63 so as to communicate with one another.

The CPU 61 is configured to control various functions of the handset 60 and the components connected to the input and output port 63 in accordance with fixed values and programs stored in, e.g., the ROM 62, or various signals transmitted and received via the DCL transmitting and receiving portion 64.

The ROM 62 is an unrewritable memory storing control programs performed by the handset 60 and stores programs for performing processings which will be described below with reference to FIG. 5. The DCL transmitting and receiving portion 64 is configured in a similar manner to the above-described DCL transmitting and receiving portion 20 and performs the wireless communication 203 between the handset 60 and the BOX 10. The panel 66 displays thereon various functional information of the handset 60. The button input portion 67 includes a plurality of buttons for performing the functions of the handset 60. It is noted that the button input portion 67 includes a facsimile transmission button, not shown, for example. The facsimile transmission button provided on the handset 60 may be provided, where the panel 66 is a touch panel, as a button for inputting a signal indicating that the facsimile transmission button has been pushed, into the input and output port 63 by the user touching on a display area of the panel 66. In this case, a part of the panel 66 functions as the facsimile transmission button.

It is noted that a plurality of the MFPs 30 can be connected to the BOX 10 in the communication system 1. Further, the DCL transmitting and receiving portion 20 of the BOX 10 can connect each of a plurality of the handsets 60 and the BOX 10 by the wireless communication 203.

There will be explained an example of a sequence of the facsimile transmission function realized in the communication system 1 with reference to FIG. 2. It is noted that details of processings shown in FIG. 2 will be explained with reference to FIGS. 3 to 6.

Figure 2:
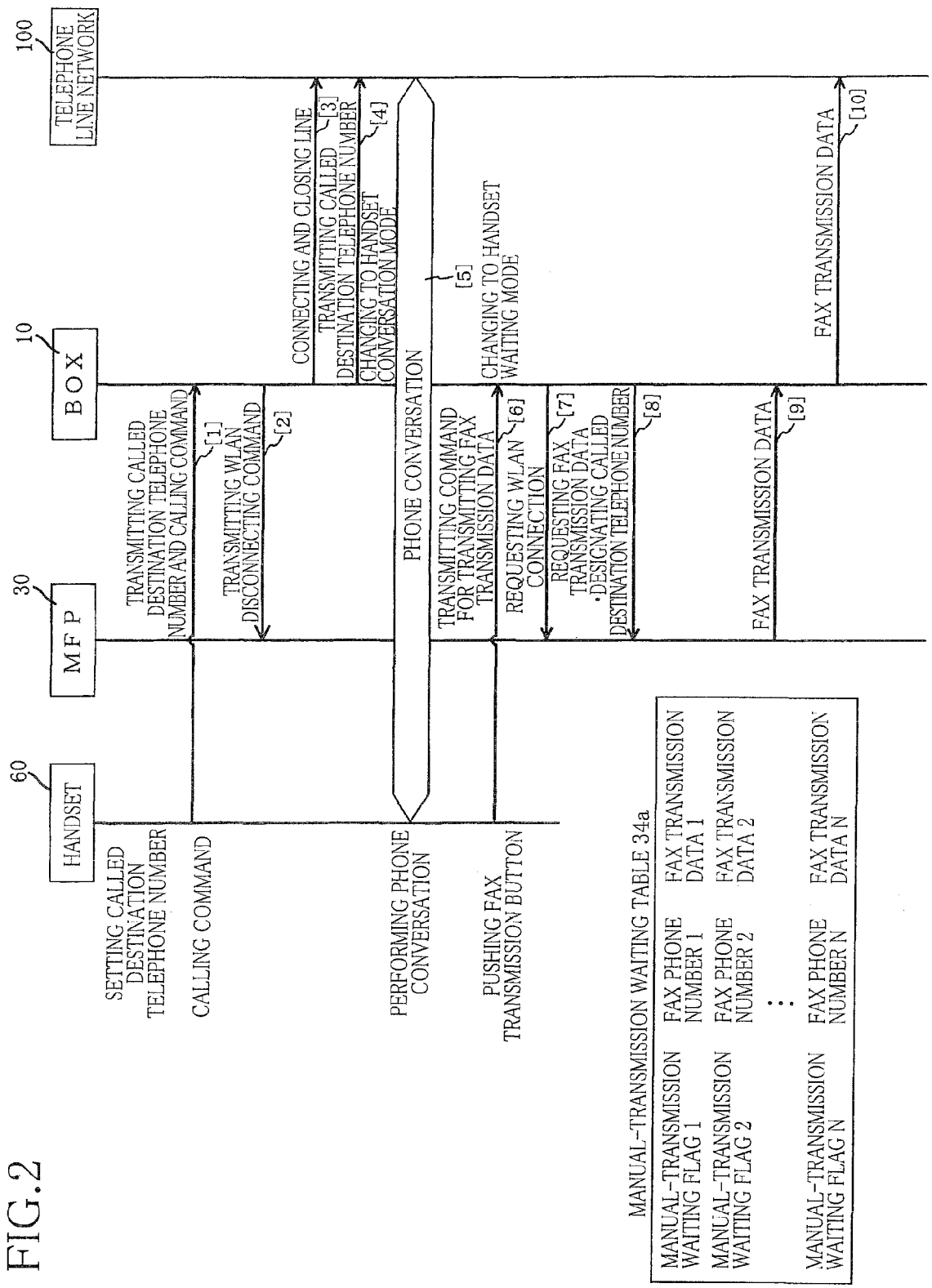
FIG. 2 is a schematic view showing an example of a sequence of a facsimile transmission function realized in the communication system.

Initially, when a user has set a called destination telephone number into the handset 60 to perform a calling, the BOX 10 is notified from the handset 60 about the called destination telephone number set by the user, that is, a calling command is performed (indicated by [1] in FIG. 2). When having received the calling command from the handset 60, the BOX 10 transmits a wireless-LAN disconnecting command to the MFP 30 ([2]) and stops data transmission from the wireless LAN transmitting and receiving portion 16. When having received the wireless-LAN disconnecting command, the MFP 30 stops data transmission from the wireless LAN transmitting and receiving portion 36. As a result, the wireless communication 202 between the BOX 10 and the MFP 30 is stopped.

Then, the BOX 10 commands the telephone-line connecting portion 19 to connect or close the line and transmits a calling signal ([3]). Then, the BOX 10 transmits the called destination telephone number ([4]) to call the external device specified by the called destination telephone number. Then, the BOX 10 changes a mode thereof from a handset waiting mode to a handset conversation mode.

When a communicable connection state in which communication between the BOX 10 and the external device is possible has been established by a response of a destination external device to the calling, the BOX 10 relays a phone conversation between (a) the handset 60 in a state in which a wireless communication is possible by the DCL transmitting and receiving portion 20 and (b) the external device in the communicable connection state in which the communication between the BOX 10 and the external device is possible by the telephone-line connecting portion 19 ([5]). That is, the wireless communication 202 using the wireless LAN is stopped upon the phone conversation, thereby making it possible to suppress a deterioration of a phone conversation quality caused by a radio interference between the wireless LAN transmitting and receiving portion 16 and the DCL transmitting and receiving portion 20. Particularly where the BOX 10 is made smaller, the radio interference is more likely to become a problem because the wireless LAN transmitting and receiving portion 16 and the DCL transmitting and receiving portion 20 have to be disposed close to each other.

However, where the BOX 10 as the present embodiment is used, it is possible to reliably suppress occurrence of the radio interference.

It is noted that the "communicable connection state" means a state in which a transmission path is secured between two apparatuses (devices) by reply of one apparatus to calling of the other apparatus and thereby interactive communication is possible between the two apparatus. In particular, in the present embodiment, a state in which one apparatus closes the line in response to the calling of the other apparatus and thereby the line is connected between the two apparatuses is referred to as the "communicable connection state".

Then, when the user has pushed the facsimile transmission button provided on the handset 60, a command for transmitting the facsimile transmission data is transmitted from the handset 60 to the BOX 10 ([6]). When having received, from the handset 60, the command for transmitting the facsimile transmission data, the BOX 10 changes the mode thereof from the handset conversation mode to the handset waiting mode while maintaining the communicable connection state with the external device. After the BOX 10 has changed its mode to the handset waiting mode, the BOX 10 does not relay transmission and receipt of the voice data between the telephone line network 100 and the handset 60. That is, the BOX 10 stops relaying the phone conversation between the handset 60 and the external device but keeps the line closed.

Then, the BOX 10 transmits a wireless LAN connection request to the MFP 30 ([7]) and establishes a wireless LAN link with the MFP 30. That is, the wireless communication 202 stopped on the basis of the calling command transmitted from the handset 60 is restarted. Further, the BOX 10 requests the MFP 30 in which the communication using the wireless communication 202 has been made possible by the wireless LAN transmitting and receiving portion 16, to transmit the facsimile transmission data to the BOX 10 ([8]). Here, the BOX 10 designates the called destination telephone number (i.e., a fax phone number of the external device in which the communicable connection state is maintained) and requests the MFP 30 to transmit the facsimile transmission data to the BOX 10.

The manual-transmission waiting table 34*a* is provided in the MFP 30. In the MFP 30, the user can operate the MFP 30 to produce the facsimile transmission data by controlling the scanner 39 to read the document. Further, the user can select any of (a) a "manual transmission" for transmitting the facsimile transmission data after the phone conversation and (b) an "automatic transmission" for transmitting the facsimile transmission data without performing the phone conversation, and can input the fax phone number. Where the user has selected the "manual transmission", the MFP 30 brings a manual-transmission waiting flag set into "1" and the fax phone number inputted by the user into correspondence with newly produced facsimile transmission data and registers these into the manual-transmission waiting table 34*a*. It is noted that data constituted by the facsimile transmission data, the manual-transmission waiting flag, and the fax phone number is made as a piece of data. The facsimile transmission data to be transferred by multicasting transmission may be stored so as to be brought into correspondence with a plurality of fax phone numbers per one set of data.

The MPF 30 reads, from the manual-transmission waiting table 34*a*, facsimile transmission data which is brought into correspondence with a fax phone number coinciding with the called destination telephone number designated by the BOX 10 among the facsimile transmission data stored in the manual-transmission waiting table 34*a* and transmits the read facsimile transmission data to the BOX 10 ([9]). When having received the facsimile transmission data transmitted from the MFP 30, the BOX 10 transmits the received facsimile transmission data to the external device in which the communicable connection state is maintained ([10]).

Thus, the user can recognize the destination external device by performing the phone conversation using the handset 60 and then command, by pushing the facsimile transmission button of the handset 60, the BOX 10 to transmit the facsimile transmission data to the destination external device. Since the phone conversation is initially performed, it is possible to suppress the occurrence of the erroneous transmission in which the transmission data is transmitted to a destination not intended. Further, since the user can input the command for the facsimile transmission from the handset 60, the user does not need to move from a place at which the user has performed the phone conversation using the handset 60 to a place at which the MFP 30 is provided, thereby reducing a burden on the user.

Further, the communicable connection state between the BOX 10 and the destination external device performing the phone conversation is maintained for a duration that the BOX 10 receives the facsimile transmission data from the MFP 30 and transmits the received facsimile transmission data to the external device. Thus, the BOX 10 does not need to recall, thereby expediting the processing and reducing a telephone bill.

Figure 3:
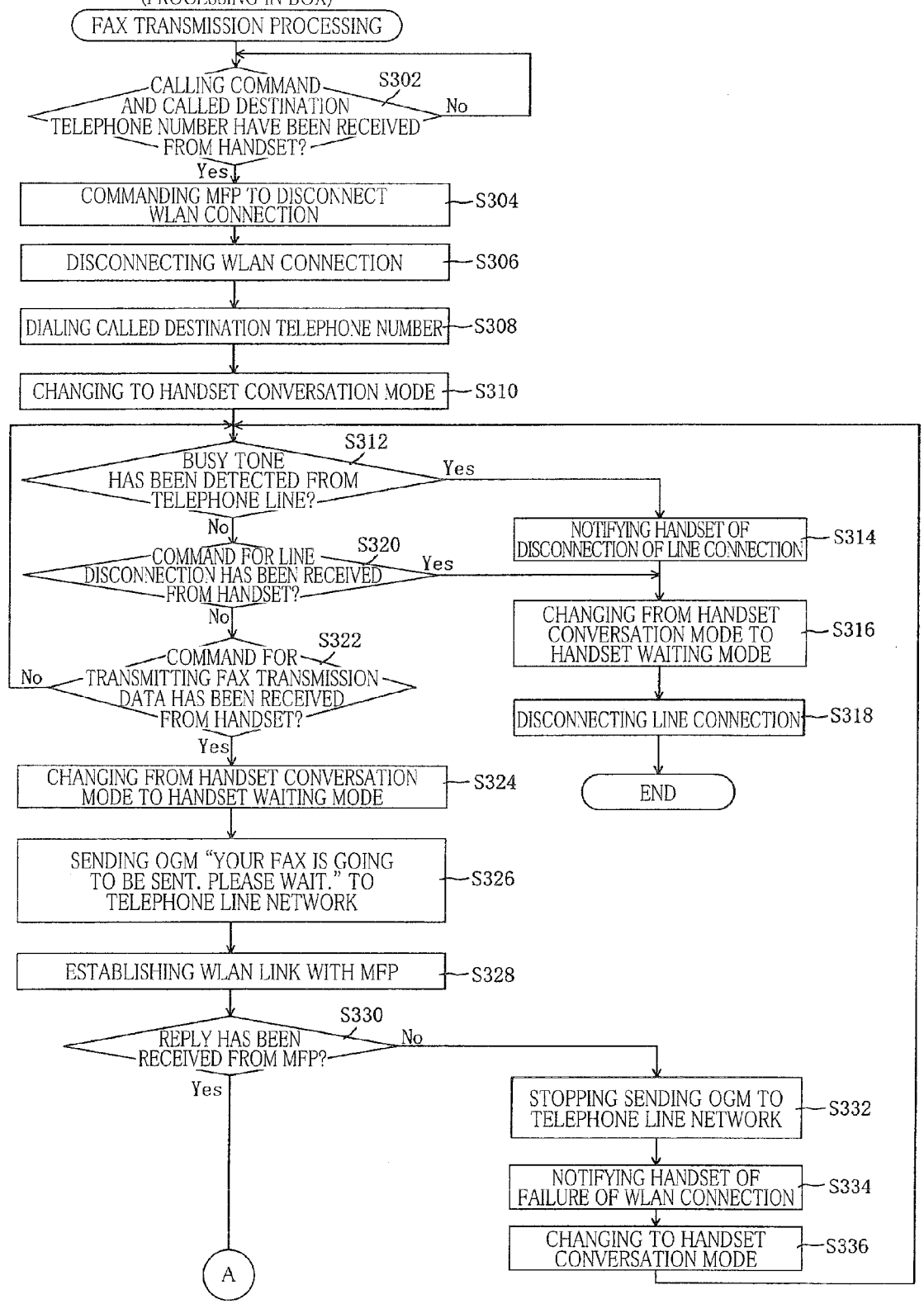
FIG. 3 is a flow-chart showing a part of a facsimile transmission processing performed by a CPU of the BOX.

There will be next explained a facsimile transmission processing performed by the CPU 11 of the BOX 10 with reference to FIG. 3. This facsimile transmission processing is a processing for realizing the facsimile transmission function and repeatedly performed from turning on a main power of the BOX 10.

Initially, in S302, the CPU 11 judges whether the BOX 10 has received the calling command and the called destination telephone number outputted from the handset 60 or not. Where the CPU 11 has judged that the BOX 10 has not received the calling command and the called destination telephone number (S302: No), the processing in S302 is reperformed. Where the CPU 11 has judged that the BOX 10 has received the calling command and the called destination telephone number (S302: Yes), the CPU 11 commands in S304 the MFP 30 to disconnect the wireless LAN connection. Then, in S306, the data transmission by the wireless LAN transmitting and receiving portion 16 is stopped to disconnect the wireless LAN connection. That is, the wireless communication 202 is stopped.

Then, in S308, the CPU 11 dials the received called destination telephone number. Then, in S310, the CPU 11 changes the mode of the BOX 10 from the handset waiting mode to the handset conversation mode. It is noted that the handset conversation mode is a mode in which a voice path and a volume are set, and the transmission and receipt of the voice data between the handset 60 and the telephone line network 100 is possible while the handset waiting mode is a mode in which the transmission and receipt of the voice data between the handset 60 and the telephone line network 100 are impossible. In the handset conversation mode, the BOX 10 can relay transmission and receipt of the voice data between the handset 60 and the external device and thereby relay the phone conversation.

Then, in S312, the CPU 11 judges whether the CPU 11 has detected a busy tone from the telephone line or not. Where the CPU 11 has judged that the CPU 11 has detected the busy tone (S312: Yes), that is, where the called external device has finished the phone conversation, the CPU 11 notifies in S314 the handset 60 about the disconnection of the line connection. Then, in S316, the CPU 11 changes the mode of the BOX 10 from the handset conversation mode to the handset waiting mode and disconnects the line connection in S318, and this facsimile transmission processing is finished.

On the other hand, where the CPU 11 has judged that the CPU 11 has not detected the busy tone (S312: No), the CPU 11 judges in S320 whether the BOX 10 has received a command for the line disconnection transmitted from the handset 60 or not. Where the CPU 11 has judged that the BOX 10 has received the command for the line disconnection (S320: Yes), the CPU 11 changes in S316 the mode of the BOX 10 from the handset conversation mode to the handset waiting mode and disconnects the line connection in S318, and this facsimile transmission processing is finished.

On the other hand, where the CPU 11 has judged that the BOX 10 has not received the command for the line disconnection (S320: No), the CPU 11 judges in S322 whether the BOX 10 has received the command for transmitting the facsimile transmission data from the handset 60 or not. Where the CPU 11 has judged that the BOX 10 has not received the command for transmitting the facsimile transmission data (S322: No), this facsimile transmission processing returns to S312. That is, the CPU 11 continues to relay the phone conversation between the handset 60 and the external device.

On the other hand, the CPU 11 has judged that the BOX 10 has received the command for transmitting the facsimile transmission data (S322: Yes), the CPU 11 changes in S324 the mode of the BOX 10 from the handset conversation mode to the handset waiting mode. As a result, the BOX 10 stops relaying the phone conversation between the handset 60 and the external device but keeps the line closed, thereby maintaining the communicable connection state between the BOX 10 and the external device as the destination of the phone conversation.

Then, in S326, the BOX 10 sends an outgoing message (hereinafter may be referred to as an "OGM") to the telephone line network 100. For example, the BOX 10 sends a message "Your fax is going to be sent. Please wait." as the voice data. That is, the BOX 10 sends the OGM until the transmission of the facsimile transmission data is started after the receipt of the command for transmitting the facsimile transmission data from the handset 60. This OGM is outputted from a handset of the external device in which the communicable connection state is maintained. Thus, there can be prevented the case where, after a calling party of the handset 60 stops the phone conversation, a called party of the external device recognizes by mistake that the line connection is disconnected, and the called party goes on-hook.

Then, in S328, the BOX 10 transmits the wireless LAN connection request to the MFP 30 and establishes the wireless LAN link with the MFP 30. This processing may take a relatively long time because an obtainment of an IP address is required. However, it can be avoided that the called party goes on-hook by mistake, by continuously sending the OGM from the BOX 10 to the destination external device.

Then, in S330, the CPU 11 judges whether the CPU 11 has received the reply from the MFP 30 or not. That is, the CPU 11 judges whether the wireless communication 202 with the MFP 30 by using the wireless LAN transmitting and receiving portion 16 is possible or not. Where the CPU 11 has judged that the BOX 10 has not received the reply from the MFP 30 (S330: No), that is, where the CPU 11 has judged that the wireless communication 202 with the MFP 30 is impossible, the CPU 11 stops in S332 sending the OGM to the telephone line network 100. Then, in S334, the CPU 11 notifies the handset 60 about a failure of the wireless LAN connection. Then, in S336, the CPU 11 changes the mode of the BOX 10 to the handset conversation mode, and this facsimile transmission processing returns to S312.

In these processings, where the CPU 11 has judged that the wireless communication 202 with the MFP 30 is impossible owing that the main power of the MFP 30 is in an "OFF" state or owing to the radio interference with another device, for example, the CPU 11 can restart the relay of the phone conversation between the handset 60 and the external device, which relay has been stopped in S324. Thus, the user can verbally tell the called party of the phone conversation about circumstances of the user's apparatus. For example, the user can tell the called party that immediate facsimile transmission is impossible because the main power of the MFP is in the "OFF" state.

On the other hand, where the CPU 11 has judged that the CPU 11 has received the reply from the MFP 30 (S330: Yes), this facsimile transmission processing goes to S338 shown in FIG. 4.

Figure 4:
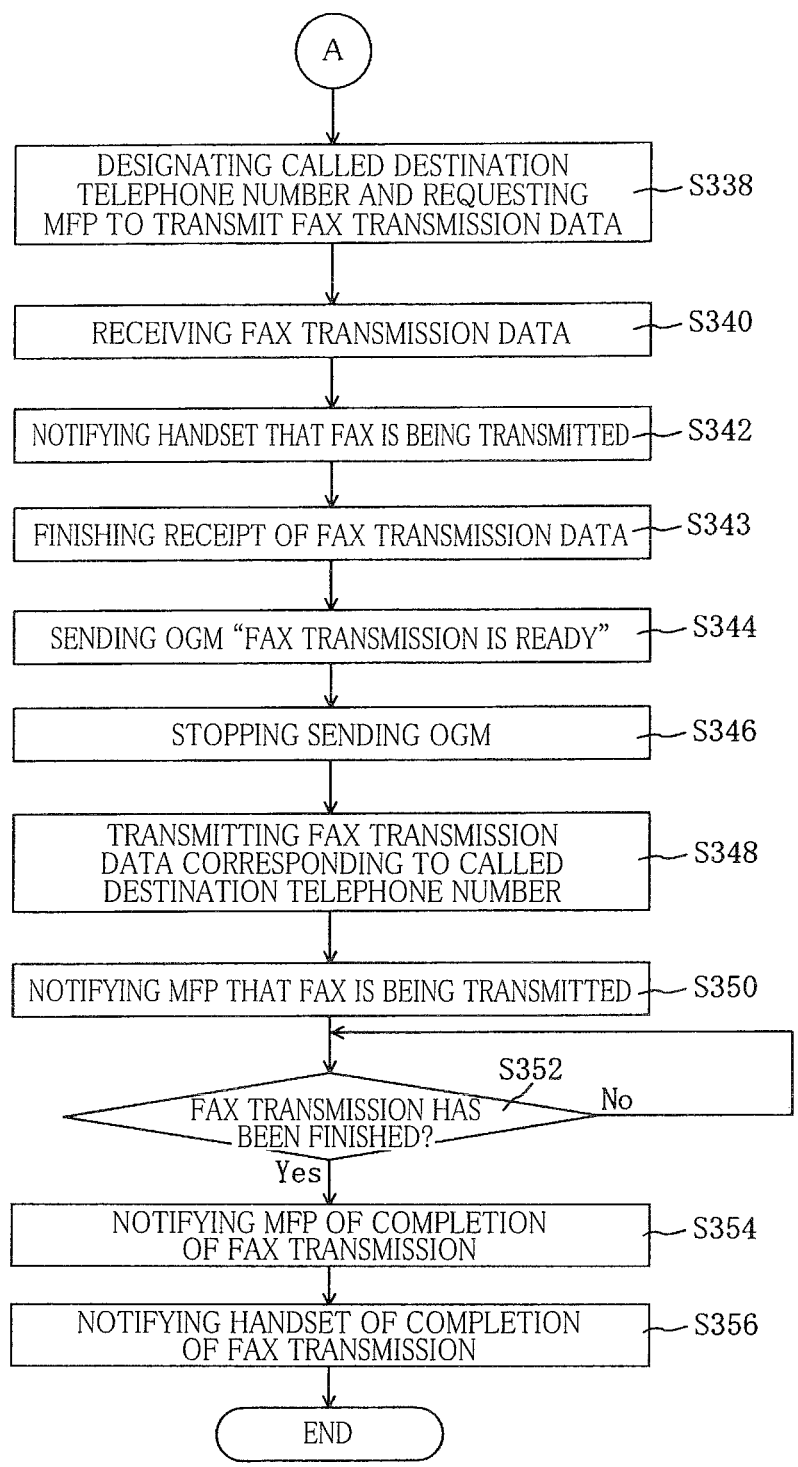
FIG. 4 is a flow-chart showing the other part of the facsimile transmission processing performed by the CPU of the BOX.

FIG. 4 is a flow-chart showing a part of the facsimile transmission processing which is continued from FIG. 3. In S338, the CPU 11 designates the called destination telephone number (i.e., the fax phone number of the external device in which the communicable connection state is maintained) and requests the MFP 30 to transmit the facsimile transmission data to the BOX 10.

Then, in S340, the BOX 10 receives the facsimile transmission data transmitted from the MFP 30. The facsimile transmission data received by the BOX 10 in this processing is facsimile transmission data which is brought into correspondence with the fax phone number coinciding with the designated called destination telephone number among the facsimile transmission data stored in the manual-transmission waiting table 34a. That is, the facsimile transmission data received by the BOX 10 in this processing is facsimile transmission data to be transmitted to the destination external device of the phone conversation.

Then, in S342, the CPU 11 notifies the handset 60 that the facsimile is being transmitted. After the CPU 11 finishes in S343 the receipt of the facsimile transmission data transmitted from the MFP 30, the CPU 11 changes in S344 a content of the OGM to be sent to the external device to "Fax transmission is ready.", for example, and sends the changed OGM to the external device. Since the message to be sent to the external device is changed on condition that the BOX 10 has finished receiving the facsimile transmission data, the CPU 11 can notify the called party of the phone conversation about the completion of a preparation for transmitting the facsimile transmission data in the BOX 10. Thus, the called party of the phone conversation can expect that the facsimile transmission data is transmitted soon, for example, on the basis of the change of the OGM. Further, where a FAX-reception starting button is provided on the called external device, the called party can start to receive the facsimile transmission data transmitted from the BOX 10 by pushing the FAX-reception starting button after confirming the change of the OGM.

Then, in S346, the CPU 11 stops sending the OGM. Then, in S348, the CPU 11 starts to transmit the facsimile transmission data received from the MFP 30. Where the BOX 10 has received a plurality of pieces of the facsimile transmission data transmitted from the MFP 30, the BOX 10 transmits all the received facsimile transmission data to the external device. In other words, the BOX 11 transmits to the external device all the facsimile transmission data stored in the manual-transmission waiting table 34a in correspondence with the fax phone number coinciding with the designated called destination telephone number. It is noted that, though not shown in the flow-chart, the BOX 10 may be configured such that the CPU 11 starts to transmit the facsimile transmission data on condition that a command for starting the facsimile transmission is transmitted from the called external device.

Then, in S350, the CPU 11 notifies the MFP 30 via the wireless communication 202 that the facsimile is being transmitted. Then, in S352, the CPU 11 judges whether the facsimile transmission has been finished or not. Where the CPU 11 has judged that the facsimile transmission has not been finished (S352: No), the CPU 11 continues to transmit the facsimile transmission data. On the other hand, where the CPU 11 has judged that the facsimile transmission has been finished (S352: Yes), the CPU 11 notifies in S354 the MFP 30 via the wireless communication 202 about the completion of the facsimile transmission. Further, the CPU 11 notifies in S356 the handset 60 via the wireless communication 203 about the completion of the facsimile transmission, and this facsimile transmission processing is finished.

According to this facsimile transmission processing, since the BOX 10 designates the called destination telephone number and requests the MFP 30 to transmit the facsimile transmission data to the BOX 10, the BOX 10 can receive, from the MFP 30, appropriate facsimile transmission data to be transmitted to the destination external device and can transmit the to-be-transmitted facsimile transmission data to the destination external device, thereby preventing the occurrence of the erroneous transmission.

Figure 5:
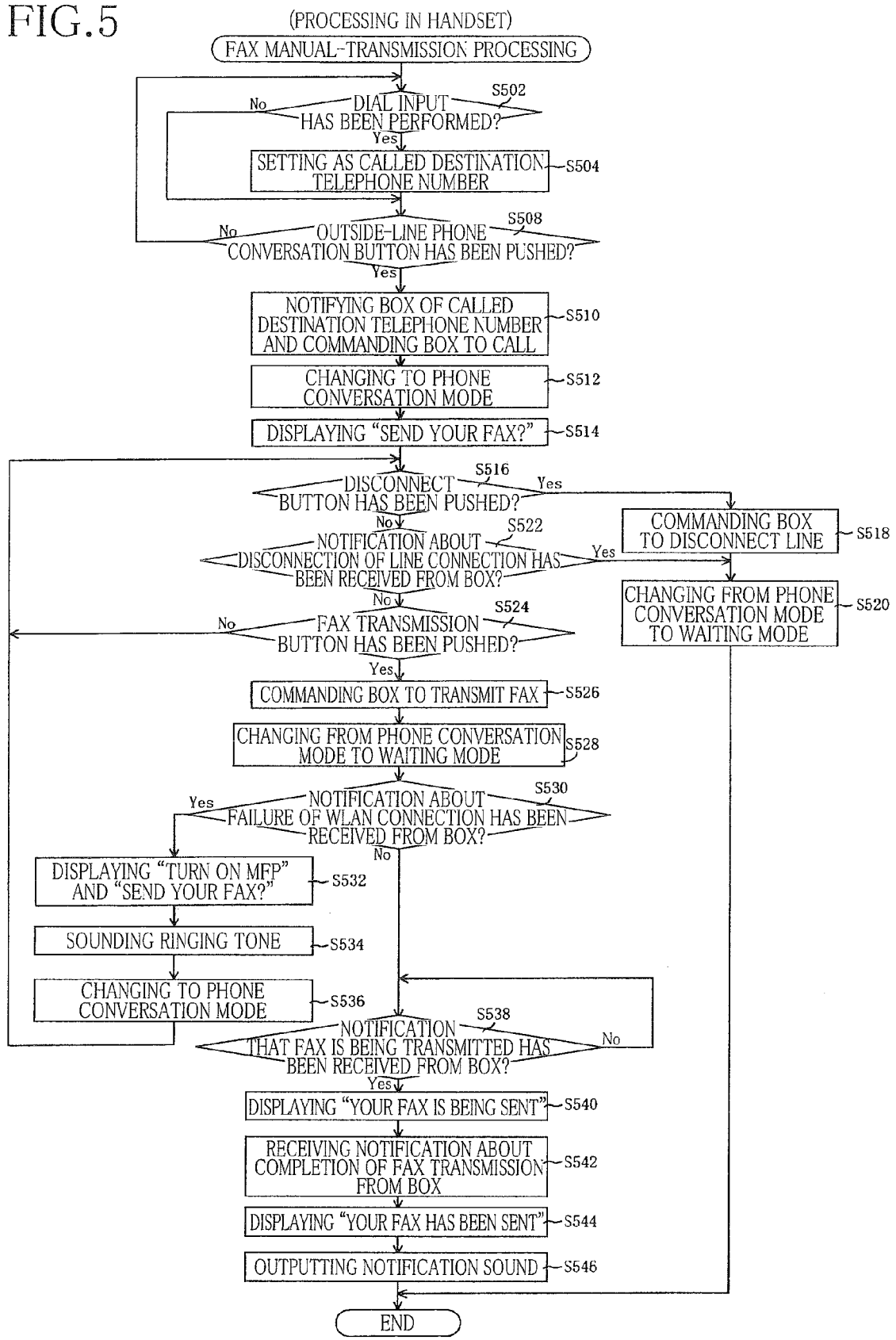
FIG. 5 is a flow-chart showing a facsimile manual-transmission processing performed by a CPU of the handset.

There will be next explained a facsimile manual-transmission processing performed by the CPU 61 of the handset 60 with reference to FIG. 5. This facsimile manual-transmission processing is a processing in which the phone conversation is performed between the user and the external device, and then, where the user has pushed the facsimile transmission button, the handset 60 commands the BOX 10 to transmit the facsimile transmission data. This processing is repeatedly performed from turning on a main power of the handset 60.

Initially, in S502, the CPU 61 judges whether an dial input has been performed or not. The user inputs the fax phone number of the external device the user intends to call, by operating or pushing the buttons provided on the handset 60 or by using a telephone book stored in the handset 60.

Where the CPU 61 has judged that the dial input has been performed (S502: Yes), the CPU 61 sets in S504 the dialed fax phone number as the called destination telephone number. On the other hand, where the CPU 61 has judged that the dial input has not been performed (S502: No), this facsimile manual-transmission processing goes to S508 by skipping S504.

Then, in S508, the CPU 61 judges whether an outside-line phone conversation button provided on the handset 60 has been pushed or not. Where the outside-line phone conversation button has not been pushed (S508: No), this facsimile manual-transmission processing returns to S502. On the other hand, where the outside-line phone conversation button has been pushed (S508: Yes), the CPU 61 notifies in S510 the BOX 10 about the set called destination telephone number and commands the BOX 10 to call.

Then, in S512, the CPU 61 changes a mode of the handset 60 to a phone conversation mode in which a voice input from a transmitter of the handset 60 and a voice output from a receiver of the handset 60 are allowed. As a result, the handset 60 takes a state in which the handset 60 can perform the phone conversation with the external device via the BOX 10. Then, in S514, the CPU 61 displays a message "Send your fax?" on the panel 66. As a result, even where a relatively long time has passed since the document has been read in the MFP 30, and thus the user has forgotten about a presence of the facsimile transmission data to be transmitted, the user can remember the presence of the facsimile transmission data.

Then, in S516, the CPU 61 judges whether a disconnect button provided on the handset 60 has been pushed or not. Where the CPU 61 has judged that the disconnect button has been pushed (S516: Yes), the CPU 61 commands in S518 the BOX 10 to disconnect the line. Then, in S520, the CPU 61 changes the mode of the handset 60 to a waiting mode in which the voice input from the transmitter of the handset 60 and the voice output from the receiver of the handset 60 are not allowed, and this facsimile manual-transmission processing is finished.

On the other hand, where the CPU 61 has judged that the disconnect button has not been pushed (S516: No), the CPU 61 judges in S522 whether the handset 60 has received a notification about the disconnection of the line connection from the BOX 10 or not. Where the CPU 61 has judged that the handset 60 has received the notification about the disconnection of the line connection (S522: Yes), this facsimile manual-transmission processing goes to S520, and the phone conversation is finished.

On the other hand, where the CPU 61 has judged that the handset 60 has not received the notification about the disconnection of the line connection (S522: No), the CPU 61 judges in S524 whether the facsimile transmission button provided on the handset 60 has been pushed or not. Where the CPU 61 has judged that the facsimile transmission button has not been pushed (S524: No), this facsimile manual-transmission processing returns to S516. On the other hand, where the CPU 61 has judged that the facsimile transmission button has been pushed (S524: Yes), the CPU 61 commands in S526 the BOX 10 to transmit the facsimile to the external device.

Then, in S528, the CPU 61 changes the mode of the handset 60 from the phone conversation mode to the waiting mode. That is, since the BOX 10 uses the line for transmission of the facsimile transmission data, the BOX 10 stops relaying the phone conversation between the handset 60 and the external device from this processing.

Then, in S530, the CPU 61 judges whether the CPU 61 has been notified from the BOX 10 about the failure of the wireless LAN connection or not. Where the CPU 61 has judged that the CPU 61 has been notified about the failure of the wireless LAN connection (S530: Yes), the CPU 61 displays in S532 messages "Turn on MFP" and "Send your fax?" on the panel 66.

Then, in S534, the CPU 61 sounds a ringing tone from a speaker, not shown, of the handset 60. Then, in S536, the CPU 61 changes the mode of the handset 60 to the phone conversation mode. In this processings, where the wireless communication 202 between the BOX 10 and the MFP 30 is impossible, the handset 60 can restart the phone conversation with the external device. Then, this facsimile manual-transmission processing returns to S516.

On the other hand, where the CPU 61 has judged that the CPU 61 has not been notified about the failure of the wireless LAN connection (S530: No), the CPU 61 judges in S538 whether the CPU 61 has been notified from the BOX 10 that the facsimile is being transmitted to the external device or not. Where the CPU 61 has judged that the CPU 61 has not been notified that the facsimile is being transmitted (S538: No), the processing in S538 is reperformed.

Where the CPU 61 has judged that the CPU 61 has been notified that the facsimile is being transmitted (S538: Yes), the CPU 61 displays in S540 a message "Your fax is being sent" on the panel 66. Then, in S542, where the CPU 61 has received a notification from the BOX 10 about the completion of the facsimile transmission, the CPU 61 displays in S544 a message "Your fax has been sent" on the panel 66 and outputs in S546 a notification sound from the speaker, not shown, and this facsimile manual-transmission is finished.

Figure 6:
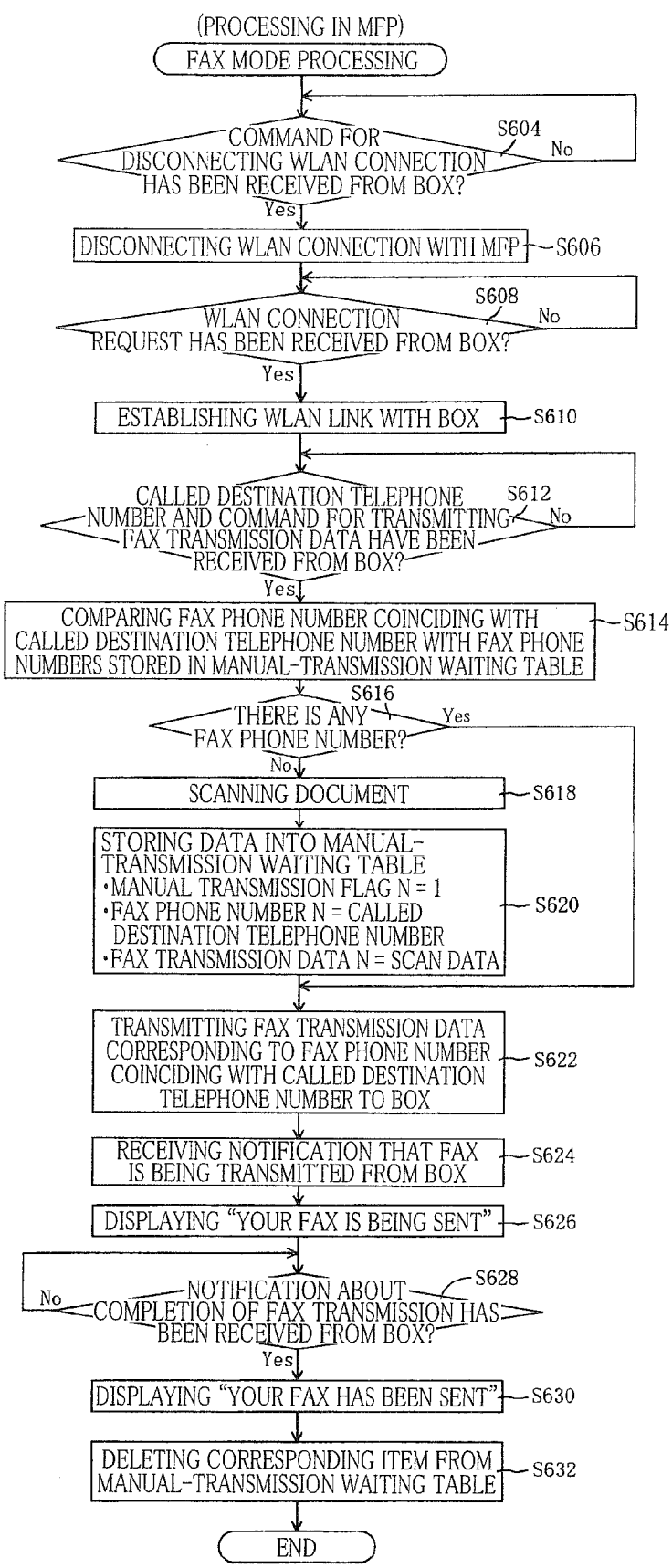
FIG. 6 is a flow-chart showing a facsimile mode processing performed by a CPU of the MFP.

There will be next explained a facsimile mode processing performed by the CPU 31 of the MFP 30 with reference to FIG. 6. This facsimile mode processing is a processing for transmitting the facsimile transmission data from the MFP 30 to the BOX 10. This processing is repeatedly performed from turning on the main power of the MFP 30.

It is noted that, though not shown in this flow-chart, the user can operate the scanner 39 of the MFP 30 to read the document and can input the fax phone number by using the button input portion 41 of the MFP 30 at any time, thereby registering the fax phone number into the manual-transmission waiting table 34a (with reference to FIG. 2) in a state in which the fax phone number and the manual-transmission waiting flag set into "1" are brought into correspondence with the facsimile transmission data.

In this facsimile mode processing, initially in S604, the CPU 31 judges whether the CPU 31 has been commanded from the BOX 10 to disconnect the wireless LAN connection or not. Where the CPU 31 has judged that the CPU 31 has not been commanded to disconnect the wireless LAN connection (S604: No), the processing in S604 is reperformed. On the other hand, where the CPU 31 has judged that the CPU 31 has been commanded to disconnect the wireless LAN connection S604 (S604: Yes), the CPU 31 stops the data transmission performed by the wireless LAN transmitting and receiving portion 36. As a result, in S606, the wireless LAN connection between the BOX 10 and the MFP 30 is disconnected. That is, the CPU 31 stops the wireless communication 202.

Then, in S608, the CPU 31 judges whether the MFP 30 has received the wireless LAN connection request transmitted from the BOX 10 or not. Where the CPU 31 has judged that the MFP 30 has not received the wireless LAN connection request (S608: No), the processing in S608 is reperformed. On the other hand, where the CPU 31 has judged that the MFP 30 has received the wireless LAN connection request (S608: Yes), the CPU 31 restarts in S610 the data transmission by the wireless LAN transmitting and receiving portion 36 and establishes the wireless LAN link with the BOX 10.

Then, in S612, the CPU 31 judges whether the MFP 30 has received, from the BOX 10, the called destination telephone number and the command for transmitting the facsimile transmission data or not. Where the CPU 31 has judged that the MFP 30 has not received the called destination telephone number and the command for transmitting the facsimile transmission data (S612: No), the processing in S612 is reperformed. On the other hand, where the CPU 31 has judged that the MFP 30 has received the called destination telephone number and the command for transmitting the facsimile transmission data (S612: Yes), the CPU 31 compares in 614 the fax phone number coinciding with the received called destination telephone number with the fax phone numbers stored in the manual-transmission waiting table 34a. Then, in S616, the CPU 31 judges whether or not there is any fax phone number coinciding with the received called destination telephone number among the fax phone numbers stored in the manual-transmission waiting table 34a. Where the CPU 31 has judged that there is any fax phone number coinciding with the received called destination telephone number (S616: Yes), the CPU 31 reads out, in S622, the facsimile transmission data with which the fax phone number has been brought into correspondence, i.e., the facsimile transmission data corresponding to the fax phone number, from the manual-transmission waiting table 34a and transmits the facsimile transmission data to the BOX 10 via the wireless communication 202. That is, the CPU 31 transmits the facsimile transmission data prepared in advance in the manual-transmission waiting table 34a to the BOX 10 as data to be transmitted to the destination external device which is the called party of the phone conversation between the handset 60 and the destination external device.

Where the CPU 31 has judged that no facsimile transmission data corresponding to the fax phone number coinciding with the called destination telephone number designated by the BOX 10 is stored in the manual-transmission waiting table 34a (S616: No), the CPU 31 drives in S618 the scanner 39 and controls the scanner 39 to automatically read the document placed on a predetermined document placed position to produce scan data. Then, in S620, the CPU 31 brings the newly produced scan data as the facsimile transmission data into correspondence with the manual-transmission waiting flag set into "1" and the fax phone number set as the called destination telephone number received from the BOX 10 and registers the scan data (the facsimile transmission data) into the manual-transmission waiting table 34a. Then, in S622, the CPU 31 transmits the registered facsimile transmission data to the BOX 10 via the wireless communication 202.

That is, where the facsimile transmission data to be transmitted to the destination external device of the phone conversation is prepared in advance in the manual-transmission waiting table 34a, the BOX 10 receives the facsimile transmission data from the MFP 30 and transmits the facsimile transmission data to the destination external device of the phone conversation. On the other hand, where the facsimile transmission data to be transmitted to the destination external device of the phone conversation is not prepared in advance in the manual-transmission waiting table 34a, the BOX 10 commands the MFP 30 to newly produce the facsimile transmission data, then receives the produced facsimile transmission data from the MFP 30, and transmits the received facsimile transmission data to the destination external device of the phone conversation.

Then, where the CPU 31 has been notified in S624 from the BOX 10 that the facsimile is being transmitted, the CPU 31 displays in S626 the message "Your fax is being sent" on the panel 40. Then, in S628, the CPU 31 judges whether the CPU 31 has received the notification about the completion of the facsimile transmission from the BOX 10 or not. Where the CPU 31 has judged that the CPU 31 has not received notification about the completion of the facsimile transmission (S628: No), the processing in S628 is reperformed. On the other hand, where the CPU 31 has judged that the CPU 31 has received the notification about the completion of the facsimile transmission (S628: Yes), the CPU 31 displays in S630 the message "Your fax has been sent" on the panel 40 and deletes in S632 an item corresponding to the facsimile transmission data having been transmitted to the BOX 10, from the manual-transmission waiting table 34a, and this facsimile mode processing is finished.

In the above-described embodiment as a first embodiment, all the facsimile transmission data corresponding to the fax phone number coinciding with the called destination telephone number among the facsimile transmission data stored in the manual-transmission waiting table 34a is transmitted from the MFP 30 to the BOX 10 and then transmitted from the BOX 10 to the external device. However, as explained below as a second embodiment, the communication system 1 may be configured such that the user can select the to-be-transmitted facsimile transmission data by operating the handset 60. It is noted that the same reference numerals as used in the first embodiment are used to designate the corresponding elements of the communication system 1 as the second embodiment, and an explanation of which is dispensed with. Further, in the second embodiment, though not shown, IDs are respectively assigned to the facsimile transmission data for identification in the manual-transmission waiting table 34a provided in the MFP 30.

FIG. 7A is a flow-chart showing a part of a facsimile manual-transmission processing performed by the handset 60 in the second embodiment. Processings in S720 to S726 shown in FIG. 7A are processings which are inserted between S530 and S538 of the facsimile manual-transmission processing (with reference to FIG. 5) in the first embodiment. FIG. 7B is a flow-chart showing a part of a facsimile transmission processing performed by the BOX 10 in the second embodiment. Processings in S710 to S718 shown in FIG. 7B are processings which are inserted between S338 and S340 of the facsimile transmission processing (with reference to FIG. 4) in the first embodiment. FIG. 7C is a flow-chart showing a part of a facsimile mode processing performed by the MFP 30 in the second embodiment. Processings in S702 to S708 shown in FIG. 7C are processings which are inserted between S614 and S624 of the facsimile mode processing (with reference to FIG. 6) in the first embodiment.

Initially, as shown in FIG. 7C, in S614, the CPU 31 of the MFP 30 judges in S614 whether or not there is any fax phone number coinciding with the called destination telephone number having been received from the BOX 10 among the fax phone numbers stored in the manual-transmission waiting table 34a. Then, in S702, the CPU 31 judges whether or not there are two or more pieces of data of the fax phone number coinciding with the called destination telephone number. Where the CPU 31 has judged that there are two or more pieces of the data (S702: Yes), the CPU 31 notifies in S704 the BOX 10 about a list of IDs corresponding to the fax phone number coinciding with the called destination telephone number.

In S710, the CPU 11 of the BOX 10 judges whether the BOX 10 has received the notification about the list of the IDs from the MFP 30 or not. Where the CPU 11 has judged that the BOX 10 has received the notification (S710: Yes), the CPU 11 notifies in S712 the handset 60 about the received list of the IDs.

In S720, the CPU 61 of the handset 60 judges whether the handset 60 has received the notification about the list of the IDs from the BOX 10 or not. Where the CPU 61 has judged that the handset 60 has received the notification (S720: Yes), the CPU 61 displays in S722 the received list of the IDs on the panel 66. Then, in S724, the CPU 61 judges whether the user has selected any of the IDs displayed on the panel 66 or not. Where the CPU 61 has judged that the user has not selected any of the IDs (S724: No), the processing in S724 is reperformed. On the other hand, where the CPU 61 has judged that the user has selected any of the IDs (S724: Yes), the CPU 61 notifies in S726 the BOX 10 about the ID selected by the user as a facsimile transmission request ID. Then, in S538, the CPU 61 judges whether or not the handset 60 has received the notification from the BOX 10 that the facsimile is being transmitted. Where the CPU 61 has judged that the handset 60 has received the notification (S538: No), this facsimile manual-transmission processing returns to S720.

In S714, the CPU 11 of the BOX 10 judges whether the BOX 10 has received the facsimile transmission request ID transmitted from the handset 60 or not. Where the CPU 11 has judged that the BOX 10 has not received the facsimile transmission request ID (S714: No), the processing in S714 is reperformed. Where the CPU 11 has judged that the BOX 10 has received the facsimile transmission request ID (S714: Yes), the CPU 11 notifies in S716 the MFP 30 about the facsimile transmission request ID received from the handset 60.

In S706, the CPU 31 of the MFP 30 judges whether the MFP 30 has received the facsimile transmission request ID transmitted from the BOX 10 or not. Where the CPU 31 has judged that the MFP 30 has not received the facsimile transmission request ID (S706: No), the processing in S706 is reperformed. Where the CPU 31 has judged that the MFP 30 has received the facsimile transmission request ID (S706: Yes), the CPU 31 transmits in S708, to the BOX 10, the facsimile transmission data corresponding to an ID coinciding with the facsimile transmission request ID.

In S718, the CPU 11 of the BOX 10 judges whether the BOX 10 has started to receive the facsimile transmission data transmitted from the MFP 30 or not. Where the CPU 11 has judged that the BOX 10 has not started to receive the facsimile transmission data (S718: No), this facsimile transmission processing returns to S710. Where the CPU 11 has judged that the BOX 10 has started to receive the facsimile transmission data (S718: Yes), the BOX 10 receives in S340 the facsimile transmission data and transmits in S348 the received facsimile transmission data to the external device. That is, the BOX 10 transmits to the external device the facsimile transmission data corresponding to the ID selected in the handset 60.

It is noted that, where the manual-transmission waiting table 34a stores a single piece of the facsimile transmission data corresponding to the fax phone number coinciding with the called destination telephone number or stores no facsimile transmission data (S702: No), the CPU 31 of the MFP 30 does not notify the BOX 10 about the list of the IDs because the CPU 31 performs the processing in S616 and the subsequent processings explained in the first embodiment. As a result, a negative decision is made in S710 in the BOX 10 (S710: No), and the processings in S712 to 5716 are skipped, that is, the BOX 10 does not notify the handset 60 about the list of the IDs. As a result, a negative decision is made in S720 in the handset 60 (S720: No), and the processings in S722 to S726 are skipped, that is, the handset 60 does not notify the BOX 10 about the selection of the ID. Thus, it is possible to reduce a load of a communication processing in the communication system 1.

According to the second embodiment, in the handset 60, the user can select the transmission data to be transmitted to the external device as the destination of the phone conversation among the plurality pieces of the facsimile transmission data. Thus, even where a plurality of users use the communication system 1, each user can transmit desired facsimile transmission data.

In view of the above, the CPU 11 can be considered to include a relaying section configured to relay the phone conversation between the handset 60 and the external device which is in the communicable connection state by the telephone-line connecting portion 19, and this relaying section can be considered to perform the processing in S310. Further, the CPU 11 can be considered to include a request section configured to request the MFP 30 via the wireless LAN transmitting and receiving portion 16 to transmit the transmission data while maintaining the connection state between the BOX 10 and the external device to the communicable connection state, when the transmission command for transmitting the transmission data has been transmitted via the communication portion from the handset 60 performing the phone conversation with the external device which is being relayed by the relaying section, and this request section can be considered to perform the processing in S338. Further, the CPU 11 can be considered to include a receiving section configured to receive the transmission data transmitted from the MFP 30 in response to the request of the request section, and this receiving section can be considered to perform the processing in S340. Further, the CPU 11 can be considered to include a transmitting section configured to transmit the transmission data received by the receiving section to the external device being in the communicable connection state, and this transmitting section can be considered to perform the processing in S348.

Further, the CPU 31 can be considered to include a judging section configured to judge whether or not the transmission data stored in the manual-transmission waiting table 34*a* is the transmission data which has been brought into correspondence with the called destination telephone number specified by the request section, and this judging section can be considered to perform the processing in S614. Further, the CPU 31 can be considered to include a new-transmission-data producing section configured to newly produce the transmission data which has been brought into correspondence with the called destination telephone number specified by the request section, where the storage portion stores therein no transmission data which has been brought into correspondence with the called destination telephone number specified by the request section, and this new-transmission-data producing section can be considered to perform the processing in S620.

Further, the CPU 11 can be considered to include a notifying section configured to notify the handset 60 that performs the phone conversation with the external device which is relayed by the relaying section about one of the transmission data received by the receiving section and the ID which has been brought into correspondence with the transmission data received by the receiving section, and this notifying section can be considered to perform the processing in S712. Further, the CPU 11 can be considered to include a sending section configured to send the OGM to the external device maintaining the communicable connection state, between the receipt of the transmission command of the transmission data from the handset 60 that performs the phone conversation with the external device which is relayed by the relaying section and the start of the transmission of the transmission data by the transmitting section, and this notifying section can be considered to perform the processing in S344.

While the embodiments of the present invention have been described above, it is to be understood that the invention is not limited to the details of the illustrated embodiments, but may be embodied with various changes and modifications, which may occur to those skilled in the art, without departing from the spirit and scope of the invention.

For example, in the above-described embodiment, the BOX 10 and the MFP 30 are wirelessly connected to each other. However, even where the BOX 10 and the MFP 30 are connected to each other by wired means, the present invention is applicable to the BOX 10.

Further, in the above-described embodiment, the MFP 30 includes the scanner 39 and controls the scanner 39 to read the document to produce the facsimile transmission data, and then transmits the produced facsimile transmission data to the BOX 10, but the MFP 30 may not include the scanner 39. For example, the MFP 30 may be configured to read data from a memory card mounted in the MFP 30, then produce the facsimile transmission data on the basis of the read data, and transmit the produced facsimile transmission data to the BOX 10.

Further, in the above-described embodiment, the fax phone number is used, but other information such as a name of a called party may be used instead of the fax phone number, for example.

Further, in the above-described embodiment, only the facsimile transmission data corresponding to the fax phone number coinciding with the fax phone number of the external device maintaining the communicable connection state among the facsimile transmission data stored in the manual-transmission waiting table 34*a* is transmitted from the MFP 30 to the BOX 10 and transmitted from the BOX 10 to the external device. However, instead of this configuration, all the facsimile transmission data stored in the manual-transmission waiting table 34*a* may be transmitted from the MFP 30 to the BOX 10 and transmitted from the BOX 10 to the external device.

Further, in the above-described embodiment, the MFP 30 and the BOX 10 are constructed independently of each other but may be constructed integrally with each other. Where the MFP 30 and the BOX 10 are constructed integrally with each other, the scanner 39 functions as the data processing apparatus, and an apparatus including the MFP 30 and the BOX 10 functions as the communication apparatus to which the present invention is applied.

Further, in the above-described embodiment, the telephone line network 100 is used as the communication network, but an ISDN line, a CATV line, and an internet may be used as the communication network, for example. Further, what is called an IP telephone system in which the voice data is transmitted and received in the form of packets may be used as the communication system 1.

Further, the MFP 30 may not include the manual-transmission waiting table 34*a* and may be configured such that, where the MFP 30 has received the request of the transmission of the facsimile transmission data from the BOX 10, the MFP 30 controls the scanner 39 to read the document to produce the facsimile transmission data and transmits the produced facsimile transmission data to the BOX 10. Further, independently of the manual-transmission waiting table 34*a*, the MFP 30 may include a table (e.g., a manipulating table) for storing facsimile transmission data the user does not intend to transmit immediately. Further, the MFP 30 may be configured such that, where the MFP 30 has received the request of the transmission of the facsimile transmission data from the BOX 10, the MFP 30 notifies the BOX 10 about the ID and so on of the facsimile transmission data stored in the manipulating table in addition to the facsimile transmission data stored in the manual-transmission waiting table 34*a* or the ID of the facsimile transmission data. Further, in the above-described embodiment, the manual-transmission waiting table 34*a* is stored in the EEPROM 34 of the MFP 30, but where the MFP 30 includes a card slot and can read out data from a memory mounted in the card slot, the manual-transmission waiting table 34*a* may be stored in the memory.

Further, in the above-described embodiment, where the MFP 30 has received the designated called destination telephone number from the BOX 10, the MFP 30 transmits the facsimile transmission data corresponding to the fax phone number coinciding with the received called destination telephone number or notifies about the ID of the facsimile transmission data. However, instead of this configuration, the MFP 30 may be configured to display the designated called destination telephone number on the panel 40. Where the MFP 30 is configured in this manner, the user can transmit appropriate facsimile transmission data from the MFP 30 to the BOX 10 by visually recognizing the called destination telephone number displayed on the panel 40 to reconfirm a name or an address of the called party and by operating the scanner 39 to read the document, for example.

Further, in the above-described embodiment, where the communication system 1 includes a plurality of the handsets 60, handset IDs respectively for identifying the handsets 60 may be respectively assigned to the handsets 60. Further, the BOX 10 may be configured to designate the handset ID of the handset 60 having transmitted the calling command (i.e., the handset 60 having performed the phone conversation) to transmit the request of the transmission of the facsimile transmission data to the MFP 30. On the other hand, the MFP 30 may be configured such that the handset IDs are registered in the manual-transmission waiting table 34a so as to be brought into correspondence with the facsimile transmission data, and where the MFP 30 has received the handset ID from the BOX 10, the MFP 30 transmits the facsimile transmission data corresponding to the received handset ID to the BOX 10 or notifies the BOX 10 about the ID of the facsimile transmission data. Where the communication system 1 is thus configured, the user can manage transmittable facsimile transmission data for each of the handsets 60, whereby an usability of the communication system 1 is improved even where the plurality of users use the communication system 1.

Further, the scanner 39 provided in the MFP 30 as the above-described embodiment may include an automatic document feeder and be configured to read a plurality of documents, but may be omit the automatic document feeder. Where the scanner 39 is configured not to include the automatic document feeder, the handset 60 may be configured such that, after transmitting the command for starting the facsimile transmission, the handset 60 instructs the user to input the number of the documents and notifies the MFP 30 via the BOX 10 about the number of the documents inputted by the user. Further, the handset 60 may be configured such that, where the number of the documents inputted by the user is plural, the handset 60 displays a message for instructing the user to operate the MFP 30, e.g., "Please make a setting on MFP for second and subsequent pages" on the panel 66. On the other hand, the MFP 30 may be configured such that, where the number of the documents is one, the MFP 30 reads the document placed at the predetermined position and transmits data of the read document as the facsimile transmission data to the BOX 10, and, where the number of the documents is plural, the MFP 30 displays a message for instructing the user to place the next document, on the panel 40 for each scanning. In this configuration, it is possible to prevent that an error in the number of the document to be read occurs in the MFP 30. Further, where a single document is scanned, the user does not need to move to a position at which the MFP 30 is placed, thereby improving the usability.

Further, the communication system 1 may be configured such that, in the case where the automatic document feeder is provided in the scanner 39, where the document is not placed at a predetermined document placed position of the automatic document feeder, the MFP 30 notifies the BOX 10 about an error, then the BOX 10 notifies the handset 60 the error, and then the handset 60 notifies the user about an occurrence of the error. Where the communication system 1 is configured in this manner, even where the user performs the phone conversation at a position distant from the position at which the MFP 30 is placed, the user can notice a mistake of not placing the document on the automatic document feeder of the MFP 30.

Further, in the facsimile transmission processing (with reference to FIG. 4) in the above-described embodiment, the CPU 11 of the BOX 10 starts in S340 to receive the facsimile transmission data transmitted from the MFP 30, and then notifies in S342 the handset 60 that the facsimile is being transmitted. Instead of these processings, the CPU 11 may perform the facsimile transmission processing (with reference to FIG. 4) such that the CPU 11 notifies the handset 60 that the facsimile is being transmitted, and then starts to receive the facsimile transmission data transmitted from the MFP 30. Where the CPU 11 performs the processing in this manner, it is possible to avoid a failure of the notification from the BOX 10 to the handset 60 due to the radio interference between the wireless LAN transmitting and receiving portion 16 and the DCL transmitting and receiving portion 20 when the BOX 10 receives the facsimile transmission data transmitted from the MFP 30.

Further, in the above-described embodiment, the CPU 11 of the BOX 10 starts to transmit the facsimile transmission data to the external device after the BOX 10 has received the facsimile transmission data transmitted from the MFP 30. Instead of this configuration, the BOX 10 may be configured to start the transmission to the external device when the BOX 10 has received part of the facsimile transmission data transmitted from the MFP 30 and to receive and transmit the facsimile transmission data simultaneously. Where the BOX 10 is configured in this manner, it is possible to reduce a waiting time to the start of the transmission of the facsimile transmission data. Further, in this configuration, where a throughput of the wireless LAN transmitting and receiving portion 16 becomes smaller than a communication speed of the modem 18 during the transmission of the facsimile transmission data to the external device, the communication speed of the modem 18 is made smaller than the throughput of the wireless LAN transmitting and receiving portion 16.

Further, the BOX 10 may be configured such that, where the facsimile transmission has been failed during the transmission of the facsimile transmission data because the line is disconnected by the external device, for example, the BOX 10 receives the transmission-failed facsimile transmission data from the manual-transmission waiting table 34a again after a predetermined length of time and transmits the obtained facsimile transmission data to the external device again. Further, this communication system 1 may be configured such that the user can check the data stored in the manual-transmission waiting table 34a from the handset 60 and delete unneeded data.

Further, in the second embodiment, the BOX 10 notifies the handset 60 about the ID of each of the facsimile transmission data, but the BOX 10 may notify the handset 60 about each of the facsimile transmission data itself or notify the handset 60 about a title of each facsimile transmission data, a created date and time, a thumbnail, and so on as identification data, for example.

Further, in the second embodiment, where the manual-transmission waiting table 34a stores the plurality of pieces of the facsimile transmission data corresponding to the fax phone number coinciding with the called destination telephone number (S702: Yes), the list of the IDs is transmitted from the MFP 30 to the BOX 10. However, instead of this configuration, the MFP 30 may be configured to notify the BOX 10 about the list of the IDs regardless of whether the called destination telephone number is equal to the fax phone number or not where the manual-transmission waiting table 34a stores the plurality of pieces of the facsimile transmission data.

It is noted that, in the above-described embodiment, where no fax phone number coinciding with the called destination telephone number is stored in the manual-transmission waiting table 34a, the MFP 30 scans the document in S618 and stores the data newly produced by the scanning into the manual-transmission waiting table 34a as the facsimile transmission data, but the present invention is not limited to this configuration. For example, where no fax phone number coinciding with the called destination telephone number is stored in the manual-transmission waiting table 34*a*, the MFP 30 may import the facsimile transmission data from, e.g., an external memory and store the imported facsimile transmission data into the manual-transmission waiting table 34*a*. According to this configuration, even where the document does not exist as a paper, the user can transmit the facsimile to the called party where the facsimile transmission data exists in the external memory, thereby improving the usability.

What is claimed is:

1. A communication apparatus comprising:
    a first communication portion configured to communicate with a sub-communication apparatus;
    a second communication portion configured to transmit and receive data to and from a data processing apparatus;
    a third communication portion configured communicate with an external communication apparatus via a telephone line;
    a communication controlling portion configured to control the third communication portion to establish communication between the communication apparatus and the external communication apparatus via the telephone line when the communication apparatus has received a connecting command from the sub-communication apparatus via the first communication portion and disconnect the communication between the communication apparatus and the external communication apparatus when the communication apparatus has received a disconnecting command from the sub-communication apparatus via the first communication portion;
    a destination-telephone-number receiving section configured to receive a destination telephone number of the external communication apparatus from the sub-communication apparatus via the first communication portion;
    a transmitting request receiving section configured to receive a transmitting request command from the sub-communication apparatus in a state in which the communication between the communication apparatus and the external communication apparatus has been established, via the telephone line, in response to the connecting command, the transmitting request command being a command for requesting the communication apparatus to transmit the data to the external communication apparatus;
    a request section configured to, in response to receipt of the transmitting request command, transmit the received destination telephone number and a request, to the data processing apparatus via the second communication portion to transmit to the communication apparatus associated data, which is associated with the received destination telephone number;
    a receiving section configured to receive the associated data transmitted from the data processing apparatus via the second communication portion in response to the request from the request section; and
    a transmitting section configured to transmit the associated data received by the receiving section to the external communication apparatus by the third communication portion via the telephone line in a state in which the established communication between the communication apparatus and the external communication apparatus via the telephone line is maintained,
    wherein the data processing apparatus comprises:
        a storage portion configured to store therein the destination telephone number and the associated data where the destination telephone number and the associated data are associated with each other; and
        a judging section configured to judge whether or not the associated data stored in the storage portion is data which has been associated with the received destination telephone number transmitted by the request section.

2. The communication apparatus according to claim 1,
    wherein the data processing apparatus comprises a new-transmission-data producing section configured to newly produce an associated data which has been associated with the received destination telephone number transmitted by the request section, when the storage portion stores therein no data which had been associated with the received destination telephone number transmitted by the request section.

3. The communication apparatus according to claim 1, further comprising a notifying section configured to notify the sub-communication apparatus of identification data which identifies the associated data from other associated data, the identification data being associated with the associated data,
    wherein the transmitting section is configured to transmit the associated data which has been associated with identification data selected in the sub-communication apparatus.

4. The communication apparatus according to claim 3,
    wherein the communication apparatus is configured to receive from the data processing apparatus, the identification data which has been associated with a plurality of pieces of the associated data having been associated with the received destination telephone number transmitted, and
    wherein the notifying section is configured to notify the sub-communication apparatus of a list of the identification data which has been associated with the plurality of pieces of the associated data.

5. The communication apparatus according to claim 1, further comprising a sending section configured to send a message to the external communication apparatus, between a receipt of the transmitting request command from the sub-communication apparatus, and a start of the transmission of the associated data by the transmitting section.

6. The communication apparatus according to claim 1,
    wherein the sub-communication apparatus comprises a command receiving portion configured to receive the transmitting request command from a user.

7. The communication apparatus according to claim 1,
    wherein the communication controlling portion is configured to maintain the established communication state between the communication apparatus and the external communication apparatus, for at least a duration of time from a start of the established communication to a completion of the transmission of the associated data to the external communication apparatus by the transmitting section.

8. A communication system comprising a data processing apparatus configured to process transmission data to be transmitted to an external communication apparatus, a communication apparatus and a sub-communication apparatus, the communication apparatus comprising:
    a first communication portion configured to communicate with a sub-communication apparatus;

a second communication portion configured to transmit and receive data to and from the data processing apparatus;

a third communication portion configured to communicate with an external communication apparatus via a telephone line; and a communication controlling portion configured to control the third communication portion to establish communication between the communication apparatus and the external communication apparatus via the telephone line when the communication apparatus has received a connecting command from the sub-communication apparatus via the first communication portion and disconnect the communication between the communication apparatus and the external communication apparatus when the communication apparatus has received a disconnecting command from the sub-communication apparatus via the first communication portion a destination-telephone-number receiving section configured to receive a destination telephone number of the external communication apparatus from the sub-communication apparatus via the first communication portion;

a transmitting request receiving section configured to receive a transmitting request command from the sub-communication apparatus in a state in which the communication between the communication apparatus and the external communication apparatus has been established, via the telephone line, in response to the connecting command, the transmitting request command being a command for requesting the communication apparatus to transmit the data to the external communication apparatus;

a request section configured to, in response to receipt of the transmitting request command, transmit the received destination telephone number and a request, to the data processing apparatus via the second communication portion to transmit to the communication apparatus associated data, which is associated with the received destination telephone number;

a receiving section configured to receive the associated data transmitted from the data processing apparatus via the second communication portion in response to the request from the request section; and a transmitting section configured to transmit the associated data received by the receiving section to the external communication apparatus by the third communication portion via the telephone line in a state in which the established communication between the communication apparatus and the external communication apparatus via the telephone line is maintained, wherein the data processing apparatus comprises:

a storage portion configured to store therein the destination telephone number and the associated data where the destination telephone number and the associated data are associated with each other; and a judging section configured to judge whether or not the associated data stored in the storage portion is the data which has been associated with the received destination telephone number transmitted by the request section.

9. The communication system according to claim 8, wherein the data processing apparatus comprises a new-transmission-data producing section configured to newly produce an associated data which has been associated with the received destination telephone number transmitted by the request section, when the storage portion stores therein no transmission data which had been associated with the received destination telephone number transmitted by the request section.

10. The communication system according to claim 8, wherein the communication apparatus further comprises a notifying section configured to notify the sub-communication apparatus of identification data which identifies the associated data from other associated data, the identification data being associated with the associated data, and wherein the transmitting section is configured to transmit the associated data which has been associated with identification data selected in the sub-communication apparatus.

11. The communication system according to claim 10, wherein the data processing apparatus is configured to transmit, where a storage portion stores therein a plurality of pieces of the associated data which have been associated with the received destination telephone number transmitted by the request section, identification data which has been associated with the plurality of pieces of the associated data having been associated with the destination telephone number, and wherein the notifying section is configured to notify the sub-communication apparatus of a list of the identification data which has been associated with the plurality of pieces of the associated data.

12. The communication system according to claim 8, wherein the communication apparatus further comprises a sending section configured to send a message to the external communication apparatus, between a receipt of the transmitting request command from the sub-communication apparatus, and a start of the transmission of the associated data by the transmitting section.

13. The communication system according to claim 8, wherein the sub-communication apparatus comprises a command receiving portion configured to receive the transmitting request command from a user.

14. The communication system according to claim 8, wherein the communication controlling portion is configured to maintain the established communication state between the communication apparatus and the external communication apparatus, for at least a duration of time from a start of the established communication to a completion of the transmission of the associated data to the external communication apparatus by the transmitting section.

* * * * *